United States Patent
McIlvaine

[15] 3,677,407
[45] July 18, 1972

[54] METHOD AND APPARATUS FOR REMOVING SLUDGE FROM LIQUID

[72] Inventor: Robert L. McIlvaine, Glencoe, Ill.

[73] Assignee: National Dust Collector Corporation, Skokie, Ill.

[22] Filed: Oct. 21, 1970

[21] Appl. No.: 82,644

[52] U.S. Cl...............................210/83, 210/519, 210/524, 210/526
[51] Int. Cl.......................................................B01d 21/24
[58] Field of Search......................210/83, 84, 294, 519, 523, 210/525, 526, 527, 532

[56] References Cited

UNITED STATES PATENTS

| | | | |
|---|---|---|---|
| 2,272,441 | 2/1942 | Streander | 210/526 X |
| 2,432,756 | 12/1947 | Hapman | 210/526 |
| 2,532,457 | 12/1950 | Morgan et al. | 210/526 X |
| 2,118,157 | 5/1938 | Camp | 210/519 X |
| 3,147,221 | 9/1964 | Johnston | 210/519 |
| 3,456,798 | 7/1969 | Urdanoff | 210/519 X |

Primary Examiner—John Adee
Attorney—Mason, Kolehmainen, Rathburn & Wyss

[57] ABSTRACT

A method and apparatus for removing sludge from liquid utilizing a settling tank having a lower settling surface for collecting settled out sludge and a lower pit at one end of the surface for receiving the settled out material. A removable sludge collection bucket is normally disposed in the pit with the upper edges of the bucket below the level of the settling surface in order to receive collected sludge. Conveyor means is provided for moving collected sludge along the settling surface for discharge into the bucket positioned in the pit. The bucket includes a bottom having valve means therein operable to close the bucket during elevation from the pit out of the tank for the discharge of collected sludge and to open for admittance of liquid when the bucket is lowered back into a collecting position within the pit. Elevator means is provided for periodically elevating the bucket from the pit in order to discharge collected sludge externally of the sludge tank, and the bucket is elevated and discharged while the level of collected sludge is below the upper edge of the bucket, thus avoiding redispersion of the material into the liquid.

11 Claims, 6 Drawing Figures

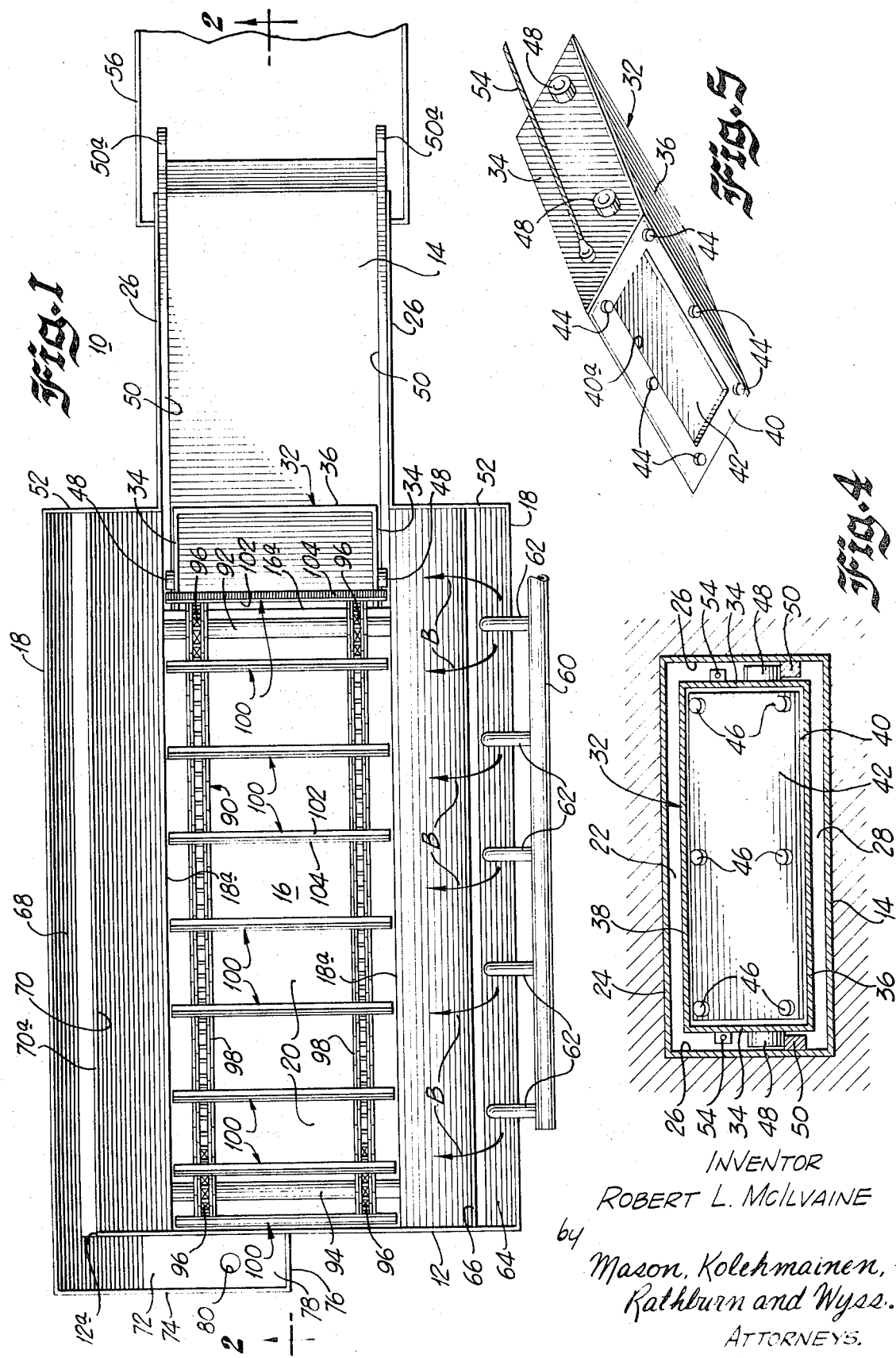

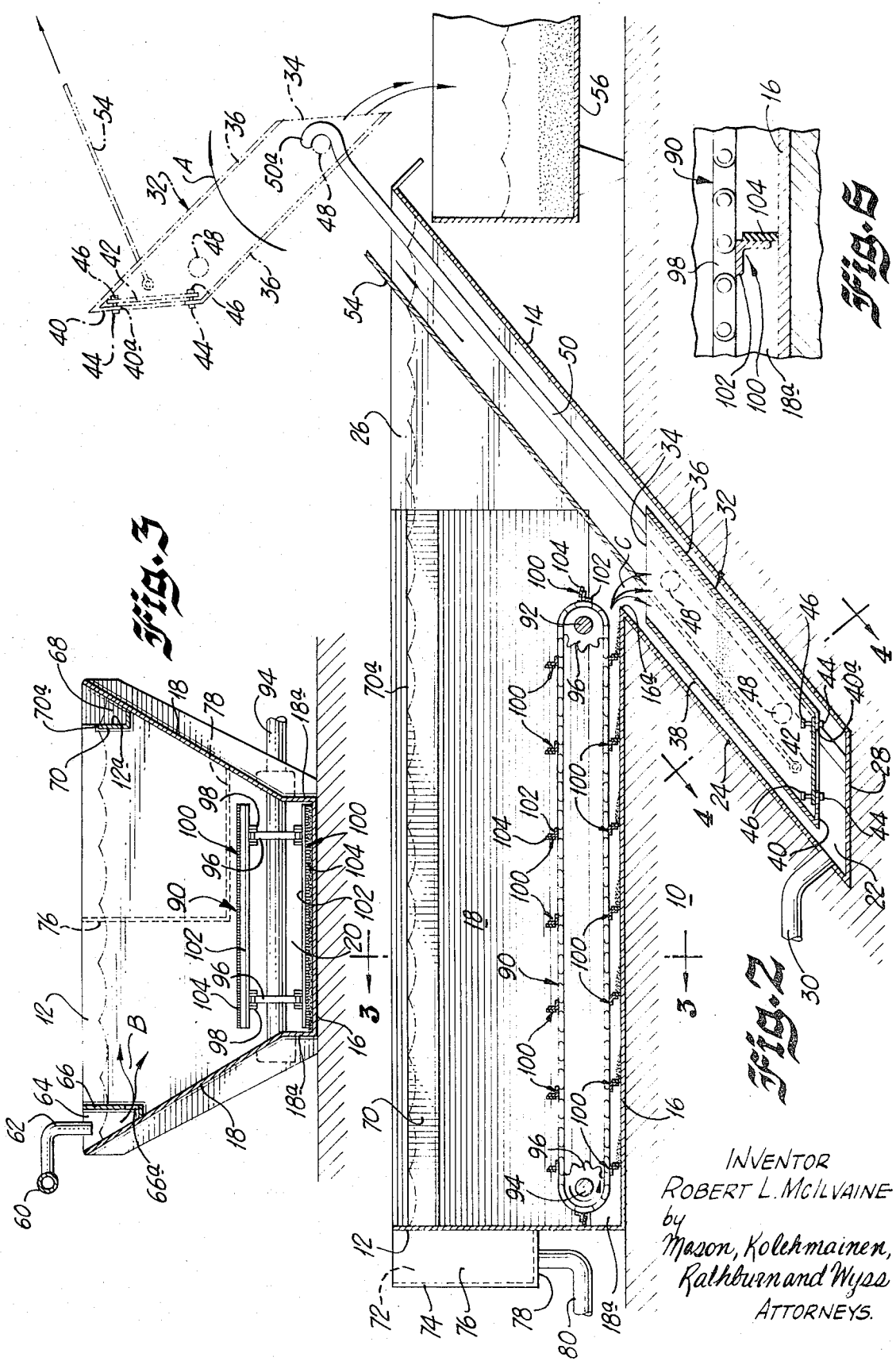

METHOD AND APPARATUS FOR REMOVING SLUDGE FROM LIQUID

The present invention is directed towards a new and improved method and apparatus tank for removing sludge-type materials from liquid and, more particularly, is directed towards a new and improved method and apparatus which is capable of effectively removing sludge materials, such as lightweight metallic oxides which settle out reasonably well but which have a tendency to redisperse when moved in such a way as to cause even the slightest washing action of liquid along the surface. Many of the more dense materials, such as sand, metal, etc., settle readily and, once having settled, have an appreciable degree of resistance to redispersion even when disturbed by washing action of the liquid. Such materials are readily removable from a settling tank by means of a conveyor flight which moves up an incline through and above the liquid level. Dewatering takes place as the material is dragged up through the upper level of the liquid. However, with lighter weight materials, such as many metallic oxides and the like, washing action of the liquid as a conveyor flight breaks water must be minimized in order to prevent a substantial amount of redispersion of the material into the liquid. One means of minimizing redispersion is to move the conveyor flight at a very low speed. However, even with lower conveyor speeds, with many lightweight metallic oxides of small particle size, it is still impractical to move the material up any substantial incline or slope because even the slightest washing action when the flight breaks the liquid surface (even at extremely low speed) is sufficient to completely redisperse or wash the material back into the liquid.

One means of overcoming the aforementioned problem is to allow material to collect and settle into a sump. From the sump, the material is then conveyed as a slurry to a secondary separating means, usually by pumping. Practical difficulties of such systems are many, and unless the material is allowed to accumulate to an appreciable depth the slurry has too low a percentage of solids to be handled efficiently. If the depth of material is permitted to become too high, surging and plugging take place and again the proportion of solids to liquid is relatively low, resulting in decreased efficiency.

The present invention overcomes many of the difficulties encountered with readily redispersible materials, such as lightweight metallic oxides, and permits these materials to be efficiently removed from liquids with a minimum of difficulty.

It is therefore an object of the present invention to provide a new and improved method and apparatus for the removal of sludge from liquids.

Another object of the present invention is to provide a new and improved settling tank apparatus capable of efficiently removing materials such as metallic oxides, which have a high tendency to redisperse when subjected to washing action.

Another object of the present invention is to provide a new and improved efficient method of removing sludge from liquids wherein the sludge contains relatively hard-to-move materials, such as metallic oxides.

Another object of the present invention is to provide a new and improved settling tank of the character described which does not require the use of a slurry pump, or the like, and yet efficiently removes metallic oxides and other lightweight materials, readily redispersible under the slightest washing action.

Another object of the present invention is to provide a new and improved settling tank capable of removing materials such as metallic oxides from liquid with a minimum of redispersion of the material back into the liquid.

For a better understanding of the invention, reference should be had to the following detailed description, taken in conjunction with the drawings, in which:

FIG. 1 is a top plan view of a settling tank system constructed in accordance with the features of the present invention;

FIG. 2 is a longitudinal vertical sectional view of the settling tank taken substantially along line 2—2 of FIG. 1;

FIG. 3 is a transverse vertical sectional view of the settling tank taken substantially along line 3—3 of FIG. 2;

FIG. 4 is a cross-sectional view through the collection pit of the settling tank taken substantially along line 4—4 of FIG. 2;

FIG. 5 is a perspective view of the collection bucket of the settling tank looking from the underside thereof; and FIG. 6 is an enlarged fragmentary sectional view showing details of the conveyor flights in the settling tank.

The foregoing and other objects and advantages of the present invention are accomplished in an illustrated embodiment comprising a new and improved settling tank having a settling surface for collecting settled out sludge and the like, and a collection pit at one end and below the settling surface. A collection bucket is normally disposed in the pit and the bucket includes sidewalls dimensioned so that the upper edges thereof are below the level of the settling surface in order to receive collected sludge directly therefrom. Conveyor means is provided for moving collected sludge along the settling surface for eventual discharge from one end thereof into the collection bucket in the pit. The bucket includes a bottom wall having valve means therein operable to close the bucket during its elevation from the pit above the water level for discharge of collected sludge externally of the tank. After discharge of the sludge, the bucket is lowered back into the tank and the valve means admits liquid into the bucket as the bucket is returned to the pit. Means is provided for periodically elevating the bucket from the pit for discharge of the collected sludge into a suitable receptacle and subsequent return of the bucket into the pit. The bucket is discharged at a time when the sludge level is below the upper edges of the bucket and no washing action occurs to redisperse the material.

Referring now, more particularly, to the drawings, apparatus of the invention is therein illustrated comprising a new and improved sludge settling tank constructed in accordance with the features of the present invention and referred to generally by the reference numeral 10 in FIGS. 1 and 2. The settling tank 10 is especially adapted for and capable of removing sludges containing readily dispersible materials, such as metallic oxides and the like, from liquid in an efficient and economic manner with little, if any, redispersion of the sludge into the liquid in the tank during the removal operation. The system is particularly well suited for use in conjunction with wet-type gas scrubbers which are provided in pollution control systems for industrial plants, such as foundries and metal making furnaces. The settling tank 10 includes a substantially trapezoidal shaped, vertical rear wall 12 having a narrow bottom and relatively wide top edge and a sloping front wall 14 having a lower portion extending down below the level of a bottom wall 16 which provides a horizontal settling surface for collecting the sludge materials settling out of the contaminated liquid introduced into the tank. A pair of opposite upwardly and outwardly sloping sidewalls 18 are provided between the front and rear walls, and each sidewall includes a short vertical wall section 18a along the bottom which defines a sludge collection pan or trough 20 (FIG. 3) extending from the rear wall towards the sloped front wall along the bottom settling surface 16.

A collection pit 22 is provided adjacent the forward end of the bottom wall 16 and the pit extending downwardly substantially below the level of the main tank. The pit 22 is generally rectangular in cross section (FIG. 4) and includes a rearwardly and downwardly sloping rear wall 24 parallel to the lower portion of the settling tank front wall 14. The wall 24 extends underneath the settling surface 16 and a pair of vertical sidewalls 26 of parallelogram shape are joined between the walls 14 and 24. The bottom of the pit is defined by a horizontal wall 28 at a level substantially below the level of the settling tank bottom wall 16. A suitable drain is provided for the pit, including a drainpipe 30 used for periodic cleaning of material which collects therein.

In accordance with the present invention, a removable collection bucket 30 is normally positioned in the pit in order to receive sludge materials discharged from the collection trough 20 of the main settlement tank. The bucket 32 includes a pair of vertical sidewalls, of parallelogram shape, a sloped front wall 36, and sloped rear wall 38 parallel thereto. The bucket is dimensioned to fit within the collection pit and includes a rectangular horizontal bottom wall 40 having a large rectangular opening 48 defined therein. In order to permit collection of sludge and sediment within the bucket 32 and subsequent removal of the collected material upon upward travel of the bucket above the water level in the tank 10, the rectangular opening 48 in the bottom wall of the bucket is provided with a movable bottom member 42 of rectangular shape which operates as a valve member to prevent discharge of sludge upon elevation of the bucket, yet permits the entry of liquid into the bucket as the bucket is lowered back into the tank after emptying. The valvelike bottom member 42 is supported on a plurality of upwardly extending studs or pins 44 positioned around the periphery of the framelike bottom wall 40 and upward movement of the bottom member 42 relative to the bottom wall 40 is limited by stop nuts 46 on the upper ends of the studs.

The collection bucket 32 is supported for movement into and out of the tank and collection pit 22 by means of rollers 48 fitted onto the outside of the bucket sidewalls 34. The rollers ride on sloped tracks 50 which are affixed to the inside surfaces of the pit sidewalls 26. The sidewalls 26 are joined to vertical front end walls 52 of the tank 10 having a generally triangular shape and, as best shown in FIGS. 1 and 2, the upper portions of the sidewalls 26 and front wall 14 provide a sloped delivery chute for movement of the bucket from a lower sludge-receiving position in the pit to an upper discharging position (shown in phantom in FIG. 2). The upper ends of the guide rails 50 are formed with hook-shaped ends 50a (FIG. 2) in order to engage the upper support rollers 48 and provide stops for pivotal movement of the bucket to discharge the sludge into a separate collection hopper 56. The bucket 32 is elevated, dumped, and lowered back into the tank by cables 54 which are pivotally attached to the sidewalls 34. After a substantial amount of sludge material has been collected in the bucket 32 positioned in the pit 22, the cables 54 are drawn upwardly, causing the bucket to roll upwardly along the sloped guide rails 50 until the upper support rollers 48 engage the hooked upper ends 50a. Further pull on the cables 54 causes pivotal movement of the bucket in clockwise direction as indicated by the arrow "A," and the collected sludge is discharged into the hopper receptacle 56.

After discharge of the sludge into the hopper is completed, the cables are paid out so that the bucket pivots in a counterclockwise direction until both the upper and lower rollers 48 are on the guide rails 50. Further slackening of the cables 54 permits the bucket 32 to move downwardly on the rails 50 into the settling tank 10 to rest in the pit 22. As the empty bucket moves downwardly and rearwardly on the rails 50 and the bottom wall 40 passes below the upper level of liquid in the settlement tank 10, the closure member 42 is free to lift upwardly away from the bottom wall 40 a limited amount, admitting liquid into the bucket from the bottom through rectangular opening 48. Accordingly, as the bucket is returned back into the settlement tank into the collection position in the kit in FIG. 2, it is rapidly filled with liquid in the tank.

Contaminated liquid to be treated is introduced into the settling tank 10 from an inlet line 60 extending parallel to one side of the tank. A plurality of L-shaped feeder pipes 62 branching off from the pipe 60 are provided to distribute incoming contaminated liquid along the length of the tank into a trough 64 which is mounted adjacent the upper edge of one of the sloped sidewalls 18. The inlet trough comprises and L-shaped or angular trough member 66 of sheet metal and the contaminated liquid flows laterally outwardly and transversely across the upper surface of the liquid in the tank through an elongated slotted opening 64a provided along the lower edge 66a of the vertical wall of the trough forming member. The incoming contaminated liquid moves laterally across the tank 10 adjacent the upper level of the liquid in the direction of the arrows "B" (FIG. 1). Movement of the liquid across the tank is at a relatively low flow velocity because of the large cross-sectional flow area of the thin wide stream of liquid. Because of the low velocity, the contaminants in the liquid gradually settle out and collect in the bottom trough 20 on the settling surface 16. Even the lighter and most easily redispersible contaminants, such as the metallic oxides and the like, are effectively settled out of the liquid.

On the opposite side of the settling tank 10 there is provided a clean liquid collecting trough 68 formed along the upper edge of the opposite tank sidewall 18. The collecting trough is formed by an L-shaped wall member 70 having an upper edge 70a forming a weir over which the liquid flows and collects in the trough. The rear end of the collection trough 68 is in communication with a clear well 72 via an opening 12a in the vertical, rear wall 12 of the settling tank. The clear well 72 is formed with a vertical back wall 74, a vertical sidewall 76, a bottom wall 78, and an opposite sidewall provided by an extension of the settling tank sidewall 18. A drainpipe 80 is provided for removing purified liquid from the clear well 72 for reuse in the scrubbing or other process with which the settling tank 10 is associated.

It will thus be seen that contaminated liquid containing sludge particles, such as lightweight metallic oxides and other particles which are readily redispersible and difficult to remove, is introduced into the settling tank adjacent one longitudinal side via the inlet trough 64 and flows laterally across the tank in low velocity flow rate over a large cross-sectional flow area. Sludge drops out of the low velocity flow and is collected on the settling surface 16 while purified liquid reaches the collection trough 68. Because the cross-sectional flow area of contaminated liquid encompasses substantially all of the upper surface of the liquid in the settling tank 10 and because the incoming contaminated liquid is substantially uniformly distributed over the length of the tank, the average flow velocity of the liquid from the inlet trough to the collection trough is uniform and relatively low, and this affords even the lightest particles of sludge and contaminants ample opportunity to settle out and collect in the collection trough 20 formed at the bottom of the tank. The purified liquid flows from the collection trough 68 into the clear well 72 at the rear end of the settling tank and the purified liquid can then be reused, for example, in a wet scrubber or the like.

The contaminant and sludge material settling out over the area above the sloping sidewalls 18 flows downwardly along the wall into the central collection trough 20 and accumulates with the material settling out from the area directly above the bottom wall 16. In order to move the settled out materials along the bottom of the trough longitudinally of the settling tank for discharge into the collection bucket 32 in the pit 22, a drag conveyor 90 is provided with the lower run of the conveyor passing through the trough 20 longitudinally along the bottom wall 16. The drag conveyor is run at relatively low speed and continuously moves the settled out sludge material toward the collection bucket at the forward end of the settling tank bottom wall 16. Because of the low speed of the conveyor, a minimum of redispersion of the materials occurs even though such materials as lightweight metallic oxides are present to a large degree. The drag conveyor 90 includes a drive shaft 92 and an idler shaft 94 adjacent the rear end of the settling tank. On both of the shafts are provided pairs of chain sprockets 96 with the continuous chain loops 98 trained over the sprockets to carry a plurality of transversely extending flights 100. Each flight includes a backing angle 102 and a flexible squeegee strip 104 of rubber or other material mounted on the advancing fact of the angle for contact against the surface of the bottom wall 16 to move the collected sludge forwardly along the trough 20 towards the collection bucket 32 in the pit 22.

As best shown in FIG. 2, the sludge collected in the trough 20 is moved forwardly along the bottom wall 16 until reaching the forward edge 16a and is discharged, as indicated by the arrow "C" into the open upper end of the collection bucket 32. The sludge gradually settles to the bottom of the bucket. The upper edges of the sidewalls 34, front wall 38, and rear wall 36 of the collection bucket are spaced below the level of the bottom wall 16 so that the collected sludge discharged by the drag conveyor 90 will settle freely into the open mouth of the collection bucket. Because the speed of the conveyor flights 100 is relatively low, there is little redispersion of the sludge material as it is discharged over the forward edge 16a of the settling surface into the open mouth of the bucket 22. The edge 16a is spaced forwardly of the upper edge of the rear wall 38 to insure substantially all of the material settles into the open bucket. Because there is little or no liquid movement in the bucket, the sludge settles rapidly and begins to build up in the bottom. When the bucket is filled to a substantial level with collected sludge but below the upper end of the bucket, the bucket is elevated and dumped, as previously described. With the collected sludge and sediment at a level substantially below the upper edges of the sidewalls, front and back walls of the bucket during the dumping operation, when the upper edges of the bucket break the surface of the water in the tank there is no washing action on the sludge and the liquid adjacent the upper level of sludge is undisturbed. Accordingly, there is no tendency for the collected sludge and sediment within the bucket to wash or redisperse into the liquid in the settlement tank. An extremely high collection efficiency is obtained even though the materials are extremely hard to remove from liquid because of the great tendency to be redispersed into the liquid with even the slightest washing action.

In practicing the invention, the contaminated liquid is distributed substantially uniformly over the upper level of the settling tank for low velocity flow over a large cross-sectional flow area. This promotes settling of even the lightest and most readily redispersible materials. The material settling out of the low velocity flow is collected in the pan or trough 20 and the material which settles onto the sloped sidewalls 18 is guided toward the central trough by the slope of the walls to form a more concentrated thickness of collected sludge. The sludge in the trough 20 is slowly, but continuously, moved by the conveyor 90 toward the discharge end 16a of the bottom wall and is discharged into the awaiting open upper end of the bucket 32. The upper end of the bucket is directly under the forward edge 16a of the bottom wall to insure that substantially all of the sludge discharged by the conveyor 90 is collected in the bucket. The collection process is continued in this manner until a substantial amount of sludge is present in the bucket, but the upper level of the sludge is still spaced below the upper edges of the bucket. The amount of spacing depends upon the characteristics of the sludge, with a more readily redispersible material requiring a greater spacing to insure that no redispersion takes place in comparison to the heavier, less readily redispersible, material. When the appropriate sludge level is reached, the conveyor is shut down and the bucket is elevated and dumped. As the upper end of the bucket breaks water, there is no washing action created to disturb the collected sludge, which is at a level somewhat below the upper end of the bucket. After dumping, the bucket is returned to the pit and the conveyor is restarted. The valve means in the bottom of the bucket permits entry of water in the lower end as the bucket is returned to the tank. This eliminates much turbulence in the tank as the bucket is being repositioned for collection.

Because of the unique arrangement of the liquid flow pattern transversely across the upper level of the settlement tank from the inlet trough 64 to the collection trough 68 at low velocity, a maximum rate of settlement to the collection trough at the bottom of the tank is provided. Because of the relatively low speed of the drag conveyor 90, little redispersion occurs between initial stages of settling out and collection in the bucket. As the bucket is removed from the tank periodically in the manner hereinbefore described, no redispersion takes place, and as a result, the settling tank 10 is extremely efficient in operation and is capable of removing from liquid extraordinarily high percentages of materials which are readily redispersible, such as the lightweight metallic oxide.

While there has been illustrated and described a single embodiment of the present invention, it will be appreciated that numerous changes and modifications will occur to those skilled in the art, and it is intended in the appended claims to cover all these changes and modifications which fall within the true spirit and scope of the present invention.

What is claimed as new and desired to be secured by letters Patent of the United States is:

1. Apparatus for removing sludge from liquid containing the same comprising a settling tank having a settling surface for collecting settled out sludge and a collection pit at one end of said surface having a bottom below said surface, a collection bucket normally disposed in said pit and having sidewalls with upper edges at a level below the level of said settling surface of said tank in order to receive collected sludge, conveyor means for moving collected sludge along said settling surface for discharge into said bucket in said pit, said bucket including a bottom wall having valve means therein operable to close the bottom of said bucket during elevation of the bucket from said pit and tank for discharge of collected sludge and to open for admitting liquid in said tank as said bucket is lowered back into said pit, and elevator means for periodically elevating said bucket from said pit for discharging collected sludge externally of said tank and thereafter returning said bucket to said pit.

2. The apparatus of claim 1 including trough means for introducing liquid containing sludge along one side of said tank adjacent the upper level of liquid therein, and weir means along an opposite side of said tank for collecting liquid after said sludge has settled therefrom onto said settling surface.

3. The apparatus of claim 1 wherein said pit includes a wall sloping under said settling surface which intersects the same at an acute angle, said bucket having an open upper end defined by said upper edges and at least one of said upper edges underlying said settling surface.

4. The apparatus of claim 3 wherein said open upper end of said bucket is positioned adjacent the intersection of said settling surface and said sloping wall of said pit to receive sludge moved off of said settling surface by said conveyor means.

5. The apparatus of claim 1 wherein said elevator means includes sloped guide means for guiding said bucket into and out of said pit and settling tank.

6. The apparatus of claim 5 including means for pivoting said bucket above said tank to discharge the contents thereof exteriorly of the tank.

7. The apparatus of claim 1 wherein said conveyor means includes a plurality of flights movable on a lower run adjacent said settling surface for moving said sludge toward said pit.

8. The apparatus of claim 7 wherein said tank includes a pair of vertical sidewall portions along opposite edges of said settling surface defining a collection trough, said lower run of said conveyor means being positioned in said trough.

9. The apparatus of claim 8 wherein said settling tank includes a pair of upwardly and outwardly sloping sidewall portions joining the upper edges of said vertical sidewall portions.

10. A method of removing sludge from liquid comprising the steps of flowing sludge contaminated liquid at low velocity over an enlarged settling surface to settle out sludge on said surface, slowly moving said settled out sludge to one end of said surface and discharging the sludge into a collection bucket positioned below one end of said settling surface, accumulating sludge in said bucket up to a selected level spaced below the upper end of said bucket, and elevating said bucket by movement upwardly along an incline path extending above the surface of said liquid for discharge of said sludge into a separate container.

11. The method of claim 10 wherein said liquid is distributed in a substantially uniform manner over the upper surface of a quantity of liquid contained in a tank.

* * * * *